J. HIGGINSON & H. ARUNDEL.
LIQUID FUEL SUPPLY ARRANGEMENT OF INTERNAL COMBUSTION ENGINES.
APPLICATION FILED MAY 23, 1912.

1,067,814.

Patented July 22, 1913.

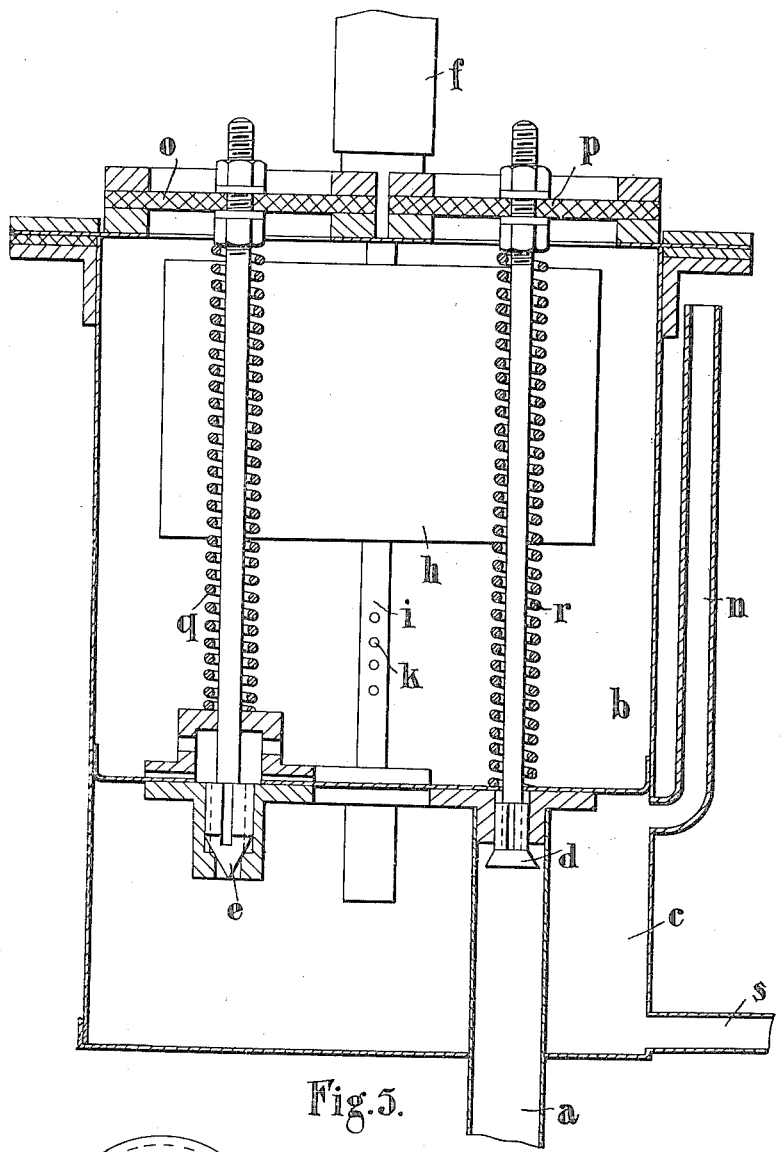
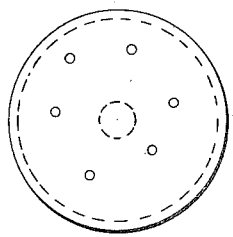

J. HIGGINSON & H. ARUNDEL.
LIQUID FUEL SUPPLY ARRANGEMENT OF INTERNAL COMBUSTION ENGINES.
APPLICATION FILED MAY 23, 1912.
1,067,814.
Patented July 22, 1913.
5 SHEETS—SHEET 4.
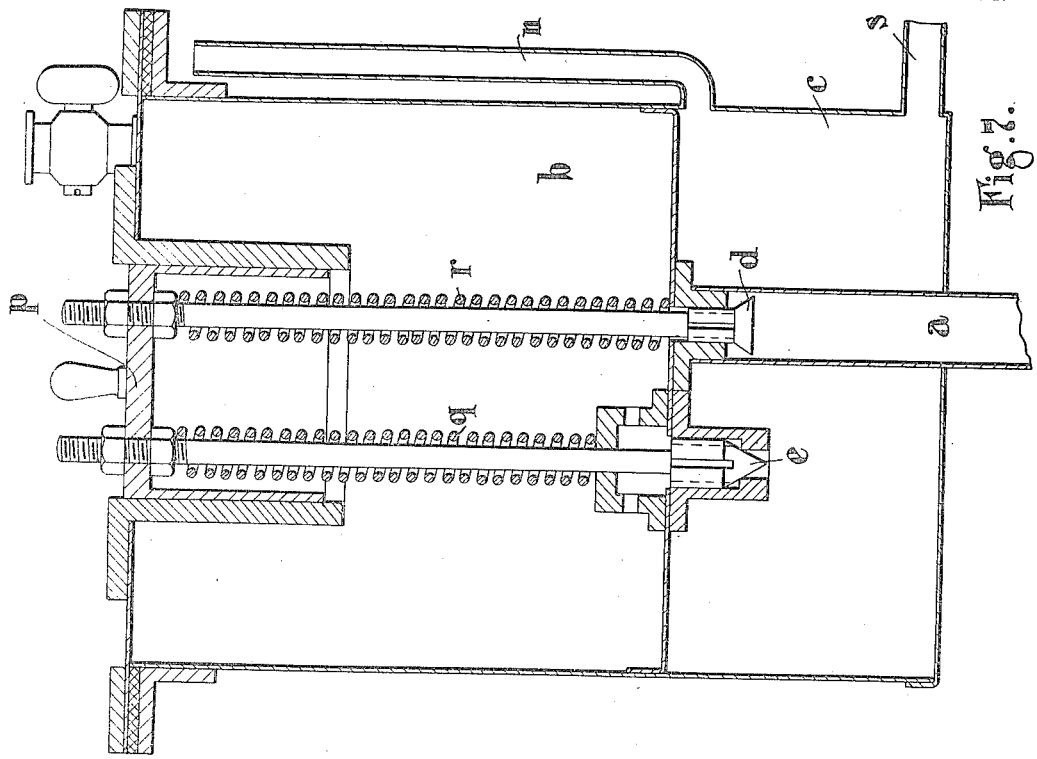
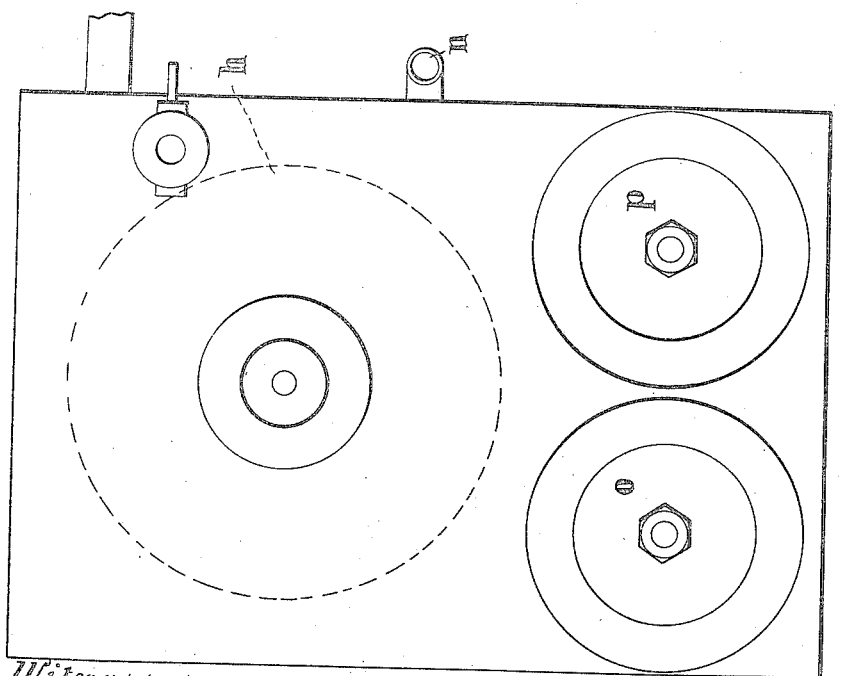

UNITED STATES PATENT OFFICE.

JOSEPH HIGGINSON AND HUBERT ARUNDEL, OF STOCKPORT, ENGLAND.

LIQUID-FUEL-SUPPLY ARRANGEMENT OF INTERNAL-COMBUSTION ENGINES.

1,067,814.  Specification of Letters Patent.  Patented July 22, 1913.

Application filed May 23, 1912. Serial No. 699,321.

*To all whom it may concern:*

Be it known that we, JOSEPH HIGGINSON and HUBERT ARUNDEL, subjects of the King of Great Britain and Ireland, residing at Sovereign Works, Stockport, in the county of Chester, England, have invented certain new and useful Improvements in the Liquid-Fuel-Supply Arrangements of Internal-Combustion Engines, of which the following is a specification.

This invention relates to the liquid fuel supply arrangements of internal combustion engines and has for its object to provide in an efficent manner for the supply of the fuel to the carbureter from the main fuel tank without the necessity for maintaining the said tank and its connections under pressure as at present usual.

Our invention comprises the combination with a main fuel supply tank, of a supplementary tank or chamber, into which the fuel is drawn by suction, the arrangement being such that when the level of the fuel in said supplementary tank or chamber reaches a predetermined height, the said tank or chamber is isolated from the source of suction and the fuel can flow therefrom to the carbureter or its equivalent.

Figure 1:
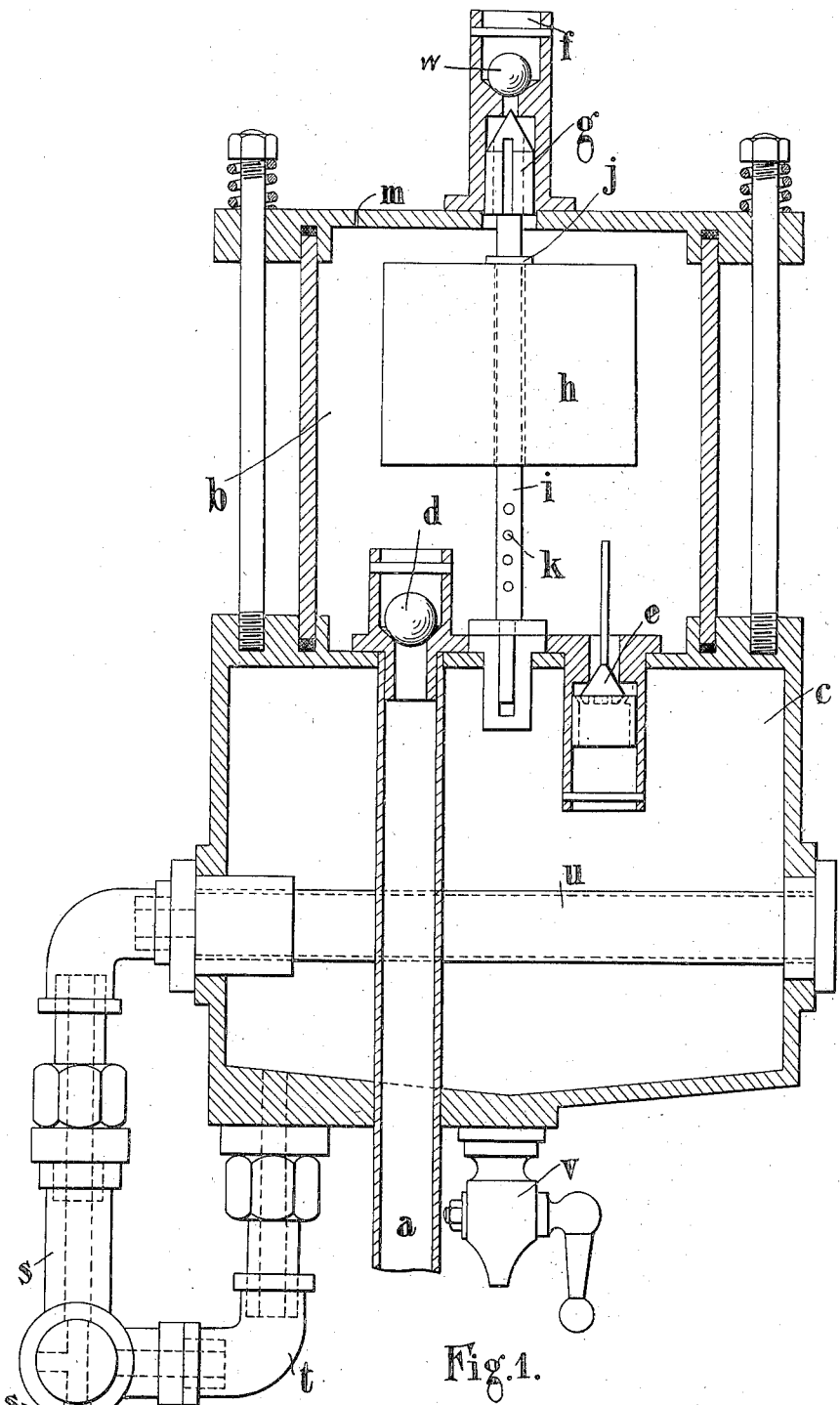
Figure 2:
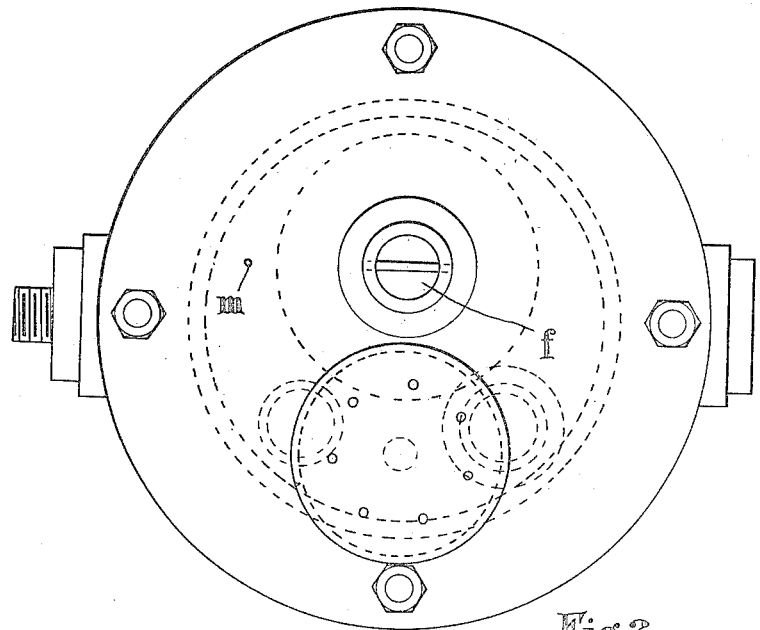
Figure 3:
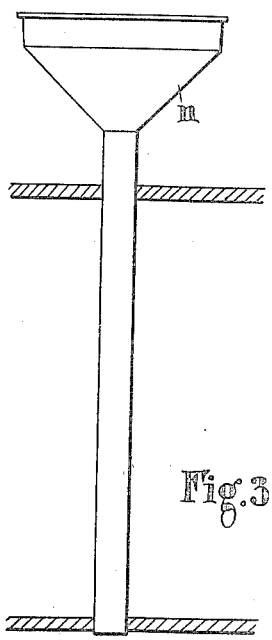
Figure 8:
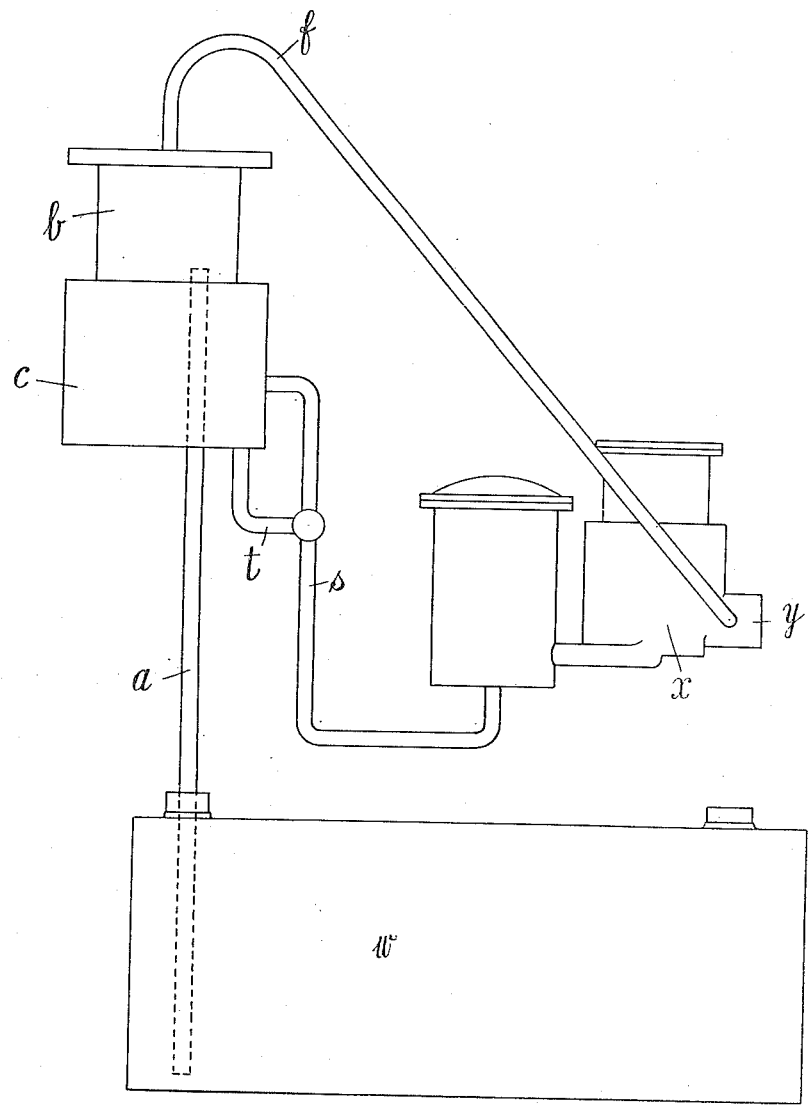

Referring to the accompanying sheets of explanatory drawings:—Figure 1 is a vertical section and Fig. 2 a plan view of apparatus constructed in one convenient form in accordance with our invention. Figs. 3 and 4 are detail views to be hereinafter referred to. Fig. 5 is a vertical section and Fig. 6 a plan view of a modified form of apparatus. Fig. 7 is a vertical section of a further modified form of apparatus. Fig. 8 is a diagrammatic view showing the general arrangement of the liquid fuel supply means.

The same reference letters in the different views indicate the same or similar parts.

In the application of our invention illustrated at Figs. 1 to 4, the main fuel supply tank $w'$, which may be arranged in any convenient position on a level with or below the carbureter $x$ (see Fig. 8), is connected by way of a pipe $a$ with a supplementary vessel or chamber $b$ preferably of relatively small capacity, the latter vessel communicating with the carbureter by way of a further or auxiliary tank or receptacle $c$. The valve $d$ is provided for controlling the flow of fluid from the main tank to the chamber $b$, and another valve $e$ for controlling the flow from the latter chamber to the auxiliary tank $c$. The vessel $b$ communicates by the passage $f$ with a source of suction, which may, for example, be the cylinder of the engine which is being fed by the supply tank aforesaid or may be an independent pump or like part. Preferably the passage $f$ leads to the carbureter induction pipe $y$ (see Fig. 8). The connection between the pipe $f$ and the vessel $b$ is controlled by a valve $g$ which is so actuated by the float $h$ that when the fuel level in $b$ rises to a predetermined height, the valve is closed, while when the said level falls to a predetermined point, it is opened. The float slides on the valve stem $i$ and engages stops or like elements thereon. The upper stop is at $j$ while the lower stop may be a pin inserted in one or other of the apertures $k$ in the stem $i$. We provide an air inlet $m$ upon the chamber $b$ and also a small air inlet to the auxiliary vessel $c$, the latter being by way of the funnel shaped part $n$ shown in Figs. 3 and 4; the said inlets insure that when the source of suction is isolated from the chamber $b$, the latter shall be placed under atmospheric pressure so that the liquid can flow therefrom by gravity to the auxiliary vessel $c$ and thence to the carbureter.

The operation of the apparatus is as follows:—Assuming that the fuel level in the vessel $b$ has fallen a predetermined amount, the float $h$ will cause the opening of the valve $g$ controlling communication with the source of suction. Immediately the vessel $b$ will be placed under a reduced pressure and the valve $d$ will be drawn off its seat so as to open the passage $a$ leading to the main fuel tank. The suction action will draw fuel into the vessel $b$ from the main tank until the level rises to a predetermined height when the suction control valve $g$ will be closed by the float. Air from the passage $m$ then recreates atmospheric pressure in the vessel $b$ which results in the closing of the valve $d$ on the main pipe $a$ and the opening of the valve $e$ on the auxiliary vessel supply connection, said valves closing and opening respectively by their own weight. The cycle of operations is then repeated.

In the arrangement shown at Figs. 5 and 6, the valves $d$ and $e$ are connected to and operated by diaphragms $o$, $p$ acting against light compression coil springs $q$, $r$. The action is however, exactly similar to that previously described, namely that the suction in the chamber $b$ acting on the diaphragms opens the valve $d$ and closes the valve $e$. When the suction is removed, the diaphragms close the valve $d$ and open the valve $e$.

In the modification illustrated at Fig. 7, both valves $d$ and $e$ are operated by the one piston $p$. The operation of the apparatus is, however, the same as with the previous apparatus.

In all cases, we may if desired, adapt the air inlet connection $n$ to the chamber $c$ to act also as a funnel for priming the apparatus when it is empty. With the arrangement illustrated at Fig. 1, the pipe $s$ leading from the chamber $c$ to the carbureter has a by-pass connection $t$ with said chamber, so that should there be but a small quantity of liquid fuel in the chamber $c$ when starting, this can be drawn off to the carbureter. A perforated or gauze tube or strainer $u$ is fitted on the inlet to the main pipe $s$. A three way cock controls the pipe $s$. The tap $v$ in Fig. 1 is for drawing off any water or impurities that may collect in the chamber $c$.

A ball or like non-return valve $w$ is placed in the suction pipe $f$ to prevent the formation of any pressure in the vessel $b$ due to back firing or other cause.

Suitable control valves and fittings may be provided where desired for regulating the flow of fuel, the inflow of air or the suction action.

Apparatus constructed in accordance with our invention is particularly advantageous for use in motor cars of low build where the main fuel supply tank is at a lower level than the carbureter.

By our arrangement, petrol leakage due to the pressure usually necessary in the petrol supply passages is obviated or minimized.

We may vary the details and arrangements of our apparatus to suit any particular requirements.

Having now described our invention, what we claim as new and desire to secure by Letters Patent is:—

1. In combination, a main liquid tank, a source of suction, a supplementary vessel receiving its liquid from said main tank, an auxiliary vessel receiving its liquid supply from said supplementary vessel, means for simultaneously isolating the latter from the source of suction and from the main tank and placing it into communication with the auxiliary vessel, and means for admitting air to said supplementary vessel, as set forth.

2. In combination, a main fuel tank, a source of suction, a supplementary vessel communicating with said main tank, a non-return valve controlling communication between said main tank and supplementary vessel, a conduit placing said source of suction in communication with the supplementary vessel, a float controlled valve for making and breaking communication between said source of suction and said supplementary vessel, an auxiliary vessel receiving liquid from said supplementary vessel, a non-return valve controlling the flow of liquid between said supplementary and auxiliary vessels, and means for admitting air to said supplementary and auxiliary vessels, as set forth.

3. In combination, a main fuel tank, a source of suction, a supplementary vessel communicating with said main tank, a non-return valve controlling communication between said main tank and supplementary vessel, a conduit placing said source of suction in communication with said supplementary vessel, a valve controlling said conduit, a float slidable upon said valve stem, means for limiting the movements of the float upon the valve stem, an auxiliary vessel receiving liquid by gravity from said supplementary vessel, a non-return valve controlling the flow of liquid between said supplementary and auxiliary vessels, and means for admitting air to said supplementary and auxiliary vessels, as set forth.

In testimony whereof we have signed our names to this specification in the presence of two subscribing witnesses.

JOSEPH HIGGINSON.
HUBERT ARUNDEL.

Witnesses:
   ARTHUR HUGHES,
   JAS. STEWART BROADFOOT.